(12) United States Patent
Nash et al.

(10) Patent No.: US 7,338,405 B2
(45) Date of Patent: Mar. 4, 2008

(54) TRANSMISSION WITH MAIN SHAFT CENTERING DEVICE

(75) Inventors: William G Nash, Clarkston, MI (US);
Kenneth T. Picone, Pinehurst, NC (US)

(73) Assignee: ArvinMeritor Technology, LLC, Troy, MI (US)

( * ) Notice: Subject to any disclaimer, the term of this patent is extended or adjusted under 35 U.S.C. 154(b) by 284 days.

(21) Appl. No.: 11/098,856

(22) Filed: Apr. 5, 2005

(65) Prior Publication Data

US 2006/0223644 A1 Oct. 5, 2006

(51) Int. Cl.
*F16H 57/08* (2006.01)
(52) U.S. Cl. ..................................... 475/347
(58) Field of Classification Search ............... 464/89, 464/90, 93, 118; 192/110 R; 475/347; 74/411
See application file for complete search history.

(56) References Cited

U.S. PATENT DOCUMENTS

| | | | | |
|---|---|---|---|---|
| 2,107,689 A | * | 2/1938 | Bugatti | ............... 464/89 X |
| 2,880,599 A | * | 4/1959 | Hlinsky | ............... 464/89 |
| 3,113,625 A | * | 12/1963 | Conover | ............... 464/89 X |
| 3,141,354 A | * | 7/1964 | Herndon et al. | ......... 475/347 X |
| 3,263,451 A | * | 8/1966 | Reimer | |
| 3,779,038 A | * | 12/1973 | Stuemky | |
| 4,304,152 A | * | 12/1981 | Michling | ............... 475/347 X |
| 4,873,882 A | * | 10/1989 | Goscenski, Jr. | ............... 74/411 |

* cited by examiner

*Primary Examiner*—Greg Binda
(74) *Attorney, Agent, or Firm*—Carlson, Gaskey & Olds

(57) ABSTRACT

A transmission includes an input shaft having an internal bore at one shaft end and a main shaft having an extension formed at one shaft end that is received within the internal bore. The internal bore is defined by an inner peripheral surface and the extension is defined by an outer peripheral surface that is spaced apart from the inner peripheral surface. A resilient member is positioned within the internal bore and reacts between the inner and the outer peripheral surfaces to center the main shaft and the input shaft relative to each other.

19 Claims, 2 Drawing Sheets

TRANSMISSION WITH MAIN SHAFT CENTERING DEVICE

TECHNICAL FIELD

The subject invention relates to a vehicle transmission including a centering device for maintaining a centered relationship between a main shaft and an input shaft.

BACKGROUND OF THE INVENTION

Transmissions having a separate input shaft and a main shaft can often be difficult to shift due to misalignment. If the main shaft is out of alignment with the input shaft, a shift collar has to move the main shaft into alignment with the input shaft such that the main shaft and input shaft are aligned along a common axis. This movement requires an increase in shift effort. Additionally, the main shaft supports a plurality of gears defining a gear plane. The farther forward the gear plane is, the greater the shift effort is to bring the main shaft into alignment with the input shaft.

One solution to decrease shift effort utilizes a steel bushing between the input shaft and the main shaft. The steel bushing is installed within a bore formed within one end of the input shaft. The main shaft includes an extension that is received within the steel bushing. After the extension is inserted within the steel bushing, a small amount of space remains between an inner surface of the steel bushing and an outer surface of the extension. This space causes the main shaft to droop or sag relative to the input shaft, which creates misalignment. As described above, the shift collar must lift the main shaft into alignment with the input shaft, resulting in increased shift effort.

Thus, there is a need for a transmission that includes a centering device for maintaining a centered relationship between a main shaft and an input shaft interface during vehicle operation that overcomes the above-mentioned deficiencies.

SUMMARY OF THE INVENTION

A transmission includes a centering device to provide a floating input shaft and main shaft interface. The centering device includes a resilient member that reacts between an input shaft and a main shaft to center the main shaft and input shaft relative to each other along a common axis.

In one embodiment, one of the input shaft and the main shaft includes a bore defined by an inner peripheral surface and the other of the input shaft and the main shaft includes an extension defined by an outer peripheral surface. The extension is at least partially received within the bore with the resilient member reacting between the inner and the outer peripheral surfaces.

In one example, a groove is formed within one of the inner and the outer peripheral surfaces. The resilient member is received within the groove.

In another example, a first reaction member is provided on the inner peripheral surface and a second reaction member is provided on the outer peripheral surface. The resilient member is in abutting engagement with the first and the second reaction members. The first and the second members are each defined by an L-shape cross-section having a long leg portion and a short leg portion. The resilient member reacts between the long leg portions of the first and the second reaction members.

The subject centering device utilizes a unique resilient member configuration that provides a floating input shaft and main shaft interface, and which maintains a centered relationship between a main shaft and an input shaft during transmission operation to facilitate transmission shifting. These and other features of the present invention can be best understood from the following specification and drawings, the following of which is a brief description.

DETAILED DESCRIPTION OF THE PREFERRED EMBODIMENT

Figure 1:
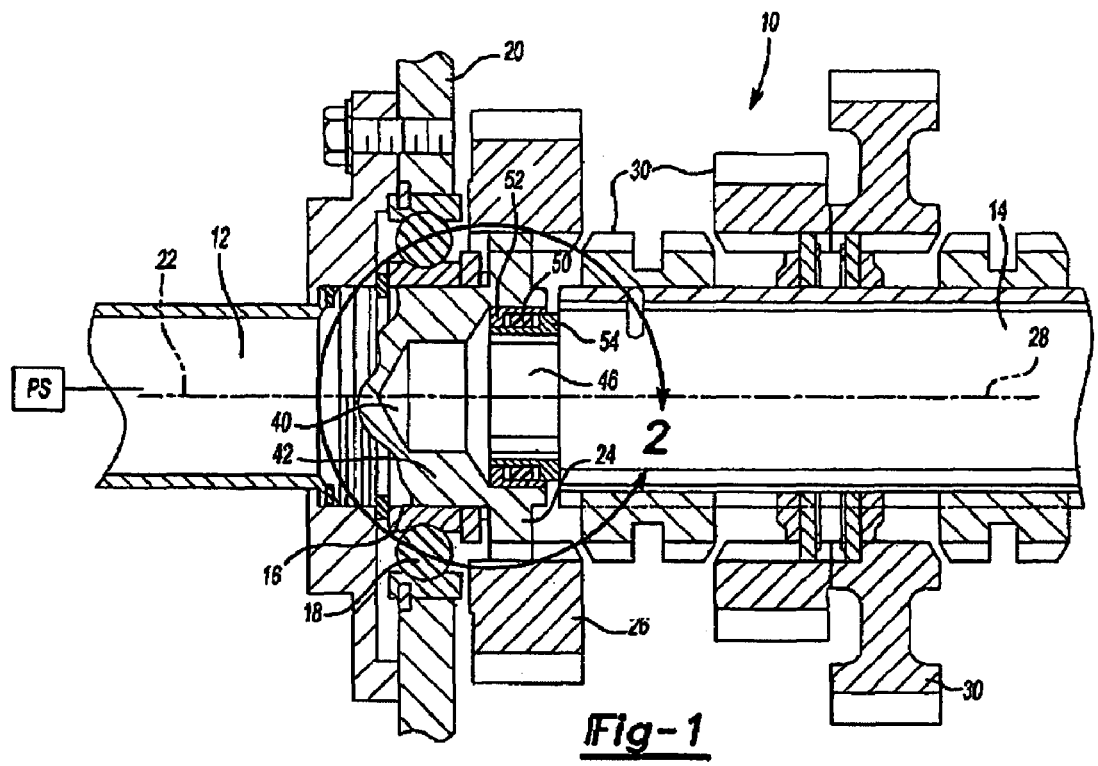
FIG. 1 is a side view of a transmission showing a main shaft, an input shaft, and a centering device incorporating the subject invention.

FIG. 1 shows a transmission 10 having an input shaft 12 and a main shaft 14. The input shaft 12 is driven by a power source PS such as an internal combustion engine or electric motor, for example. The input shaft 12 includes an outer surface 16 that is supported on a bearing 18 mounted to a support plate 20. The input shaft 12 rotates about an input axis 22 and includes a gear portion 24 that drives a first gear 26.

The main shaft 14 defines a main axis 28 and supports a plurality of gears 30. A shifting mechanism (not shown) shifts to engage at least one of the gears 30 to provide a desired gear ratio as known. The shifting mechanism selectively engages a different gear 30 to change to another gear ratio as needed. Any shifting mechanism known in the art could be utilized with the subject invention. Further, it should be understood that the gear configuration shown in FIG. 1, is just one example of a gear configuration and that other gear configurations could also benefit from the subject invention.

The input shaft 12 includes a bore 40 formed within one shaft end 42. The bore 40 defines an inner peripheral surface 44. The main shaft 14 includes an extension 46 that defines an outer peripheral surface 48. The extension 46 is received within the bore 40 such that the outer peripheral surface 48 faces the inner peripheral surface 44. While FIG. 1 shows an extension 46 on the main shaft 14 and a bore 40 in the input shaft 12, it should be understood that a reverse configuration could also be used with a bore formed within the main shaft 14 and an extension formed on the input shaft 12.

A centering device includes a resilient member 50 that is positioned between the main shaft 14 and the input shaft 12 within the bore 40. The resilient member 50 reacts between the inner peripheral surface 44 and the outer peripheral surface 48 to maintain a centered relationship between the main shaft 14 and the input shaft 12. The resilient member 50 provides a floating interface connection that maintains a substantially collinear alignment between the input axis 22 and the main axis 28.

The resilient member 50 is formed from an elastomeric, Teflon®, or any other appropriate material. The resilient member 50 comprises a ring, a band, or annular member that surrounds the extension 46. In one example, the resilient member 50 comprises an O-ring. The O-ring can have a round, square, or any other cross-sectional shape.

Figure 2:
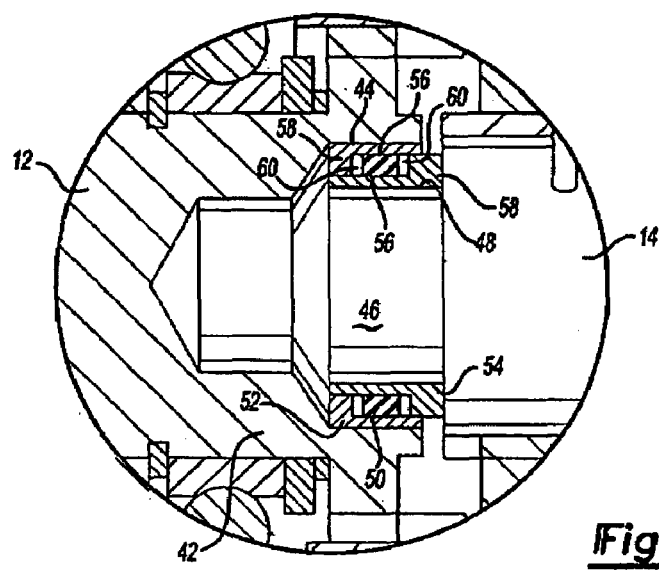
FIG. 2 is a magnified view of the area indicated at 2 in FIG. 1.

In the configuration shown in FIGS. 1 and 2, the resilient member 50 is positioned between first 52 and second 54 reaction members. The first reaction member 52 is mounted on the inner peripheral surface 44 and the second reaction member 54 is mounted on the outer peripheral surface 48. The first 52 and second 54 reaction members are preferably formed from a rigid material such as metal or plastic, for example. The first 52 and second 54 reaction members can be slid into engagement with the inner 44 and outer 48 peripheral surfaces, respectively, or can be installed with a slight press-fit if needed.

Each of the first 52 and second 54 reaction members is defined by an L-shaped cross-section having a long leg portion 56 and a short leg portion 58. The long leg portions 56 extend in a direction generally parallel to the main axis 28 and input axis 22. The short leg portion 58 of the first reaction member 52 extends in a direction radially inward toward the main axis 28 and input axis 22. The short leg portion 58 of the second reaction member 54 extends in a direction radially outward from the main axis 28 and input axis 22. The resilient member 50 is in direct abutting engagement with both of the long leg portions 56 of the first 52 and second 54 reaction members. The resilient member 50 is positioned axially between the short leg portions 58.

At least one annular space 60 is provided between one of the short leg portions 58 and the resilient member 50 in a direction along the main axis 28 and input axis 22. In the configuration shown in FIGS. 1 and 2, annular spaces 60 are shown between each short leg portion 58 and the resilient member 50. The annular spaces 60 are provided for tolerance purposes to accommodate for linear movement between the input shaft 12 and the main shaft 14 in a direction along the main axis 28 and input axis 22.

Figure 3:
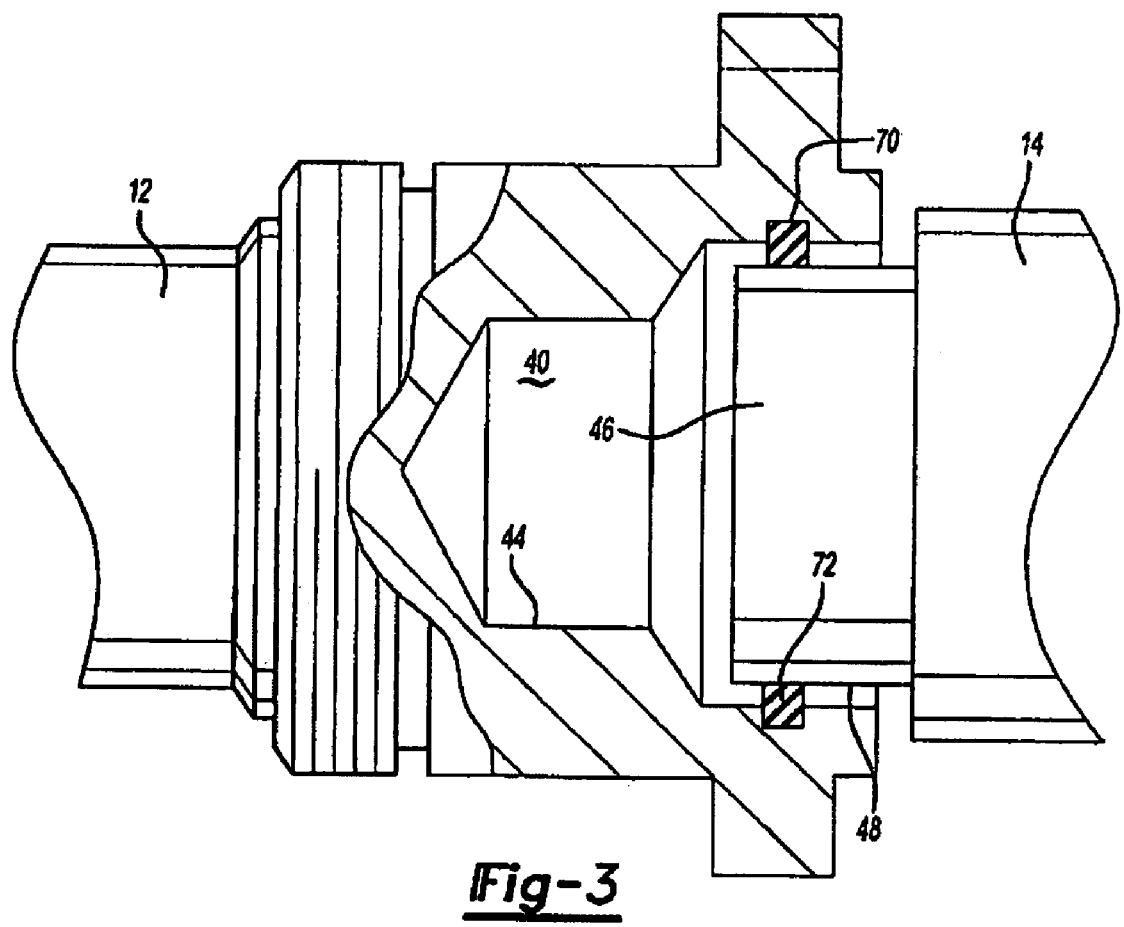
FIG. 3 is another example of a centering device.

Another example of a centering device is shown in FIG. 3. In this configuration, one of the bore 40 and extension 46 includes a groove 70 formed in the inner peripheral surface 44 or outer peripheral surface 48. In the example shown, the groove 70 is formed within the inner peripheral surface 44 of the bore 40. A resilient member 72 is received within the groove 70. The resilient member 72 comprises an O-ring or other similar member as described above.

The subject centering device utilizes a unique resilient member configuration that provides a floating input shaft and main shaft interface, which eliminates drooping or sagging of the main shaft 14 relative to the input shaft 12. The centering device also maintains a centered relationship between the main shaft 14 and the input shaft 12 during transmission operation to reduce transmission shifting effort.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A transmission comprising:
   an input shaft having first and second ends with said first end to be driven by a vehicle power source and said second end supporting a transmission drive gear;
   a main shaft coupled to said input shaft, said main shaft supporting a plurality of transmission gears that provide different gear reduction ratios for varying operating speeds of a vehicle transmission, and wherein said input shaft drives said main shaft to operate the vehicle transmission; and
   a resilient member reacting between said input shaft and said main shaft to center said main shaft and said input shaft relative to each other, said resilient member providing a floating interface between said input shaft and said main shaft with said transmission drive gear being positioned on said input shaft to surround at least a portion of said resilient member.

2. The transmission according to claim 1 wherein said input shaft defines an input axis of rotation and said main shaft defines a main axis, said resilient member maintaining a collinear relationship between said main axis and said input axis.

3. The transmission according to claim 1 wherein one of said input shaft and said main shaft includes a bore at one shaft end and the other of said input shaft and said main shaft includes an extension at one shaft end, said extension being received within said bore.

4. The transmission according to claim 3 wherein said bore is defined by an inner peripheral surface and said extension is defined by an outer peripheral surface and wherein said resilient member is positioned between said outer peripheral surface and said inner peripheral surface.

5. The transmission according to claim 4 including a first reaction member mounted to said inner peripheral surface and a second reaction member mounted to said outer peripheral surface and wherein said resilient member is in direct abutting engagement with said first and said second reaction members.

6. The transmission according to claim 4 including a groove formed in one of said inner peripheral surface and said outer peripheral surface wherein said resilient member is received within said groove.

7. The transmission according to claim 6 wherein said resilient member comprises an O-ring.

8. The transmission according to claim 1 wherein said resilient member comprises an elastomeric band surrounding an end of one of said input shaft and said main shaft.

9. A transmission comprising:
   an input shaft defining an input axis of rotations;
   a main shaft coupled to said input shaft, said main shaft supporting at least one transmission gear, and wherein one of said input shaft and said main shaft includes a bore at one shaft end and the other of said input shaft and said main shaft includes an extension at one shaft end, said extension being received within said bore, and wherein said bore is defined by an inner peripheral surface and said extension is defined by an outer peripheral surface;
   a resilient member reacting between said input shaft and said main shaft to center said main shaft and said input shaft relative to each other, said resilient member being positioned between said outer peripheral surface and said inner peripheral surface;
   a first reaction member mounted to said inner peripheral surface; and
   a second reaction member mounted to said outer peripheral surface, and wherein said resilient member is in direct abutting engagement with said first and said second reaction members, and wherein said first and said second reaction members each have an L-shaped cross-section with a long leg extending in a direction generally parallel to said input axis of rotation and a short leg extending in a direction generally transverse to said input axis of rotation.

10. The transmission according to claim 9 wherein said resilient member is axially positioned between said short legs of said first and said second reaction members in a direction along said input axis of rotation.

11. A transmission comprising:
    an input shaft defining an input axis of rotation;
    a main shaft coupled to said input shaft, said main shaft supporting at least one transmission gear, and wherein one of said input shaft and said main shaft includes a bore at one shaft end and the other of said input shaft and said main shaft includes an extension at one shaft end, said extension being received within said bore, and wherein said bore is defined by an inner peripheral surface and said extension is defined by an outer peripheral surface;

a resilient member reacting between said input shaft and said main shaft to center said main shaft and said input shaft relative to each other, said resilient member being positioned between said outer peripheral surface and said inner peripheral surface;

a first reaction member mounted to said inner peripheral surface;

a second reaction member mounted to said outer peripheral surface, and wherein said resilient member is in direct abutting engagement with said first and said second reaction members, and wherein said first and said second reaction members each have an L-shaped cross-section with a long leg extending in a direction generally parallel to said input axis of rotation and a short leg extending in a direction generally transverse to said input axis of rotation; and wherein, said resilient member is axially positioned between said short legs of said first and said second reaction members in a direction along said input axis of rotation, and including at least one annular gap formed between one of said short legs of said first and said second reaction members and said resilient member.

12. A transmission comprising:
an input shaft having first and second ends with said first end to be driven by a vehicle power source and said second end supporting a transmission drive gear, and said input shaft having an internal bore formed within one of said first and said second ends, said internal bore being defined by an inner peripheral surface, and said internal bore being formed directly within an end face of input shaft such that at least a portion of said transmission drive gear surrounds said internal bore;

a main shaft having an extension formed at one main shaft end, said extension being defined by an outer peripheral surface that is at least partially received within said internal bore, and wherein said main shaft supports a plurality of transmission gears, said main shaft being driven by said input shaft to operate a vehicle transmission; and a resilient member positioned between said outer peripheral surface and said inner peripheral surface to center said main shaft and said input shaft relative to each other.

13. The transmission according to claim 12 wherein said input shaft defines an input axis of rotation and said main shaft defines a main axis and wherein said inner peripheral surface extends circumferentially about said input axis and said outer peripheral surface extends circumferentially about said main axis with said resilient member reacting between said inner peripheral surface and said outer peripheral surface to maintain a collinear relationship between said input axis and said main axis.

14. The transmission according to claim 12 including a first reaction member mounted to said inner peripheral surface and a second reaction member mounted to said outer peripheral surface wherein said resilient member is in direct abutting engagement with said first and said second reaction members.

15. The transmission according to claim 14 wherein said first and said second reaction members are comprised of a rigid material and said resilient member is comprised of an elastomeric material.

16. The transmission according to claim 12 including a groove formed in one of said inner peripheral surface and said outer peripheral surface wherein said resilient member is received within said groove.

17. Transmission according to claim 12 wherein said resilient member comprises an annular band surrounding said outer peripheral surface.

18. A transmission comprising:
an input shaft having an internal bore formed within one input shaft end, said internal bore being defined by an inner peripheral surface;

a main shaft having an extension formed at one main shaft end, said extension being defined by an outer peripheral surface that is at least partially received within said internal bore, and wherein said main shaft supports a plurality of transmission gears, said main shaft being driven by said input shaft to operate a vehicle transmission, and said input shaft and said main shaft extending along a common axis;

a resilient member positioned between said outer peripheral surface and said inner peripheral surface to center said main shaft and said input shaft relative to each other;

a first reaction member mounted to said inner peripheral surface; and a second reaction member mounted to said outer peripheral surface wherein said resilient member is in direct abutting engagement with said first: and said second reaction members, and wherein said first and said second reaction members are defined by an L-shape cross-section having a long leg portion extending in a direction generally parallel to said common axis and a short leg potion extending in a direction transverse to said common axis.

19. The transmission according to claim 18 wherein said resilient member is in direct abutting engagement with said long leg portions of said first and said second reaction members.

* * * * *

UNITED STATES PATENT AND TRADEMARK OFFICE
CERTIFICATE OF CORRECTION

PATENT NO. : 7,338,405 B2 Page 1 of 1
APPLICATION NO. : 11/098856
DATED : March 4, 2008
INVENTOR(S) : Nash et al.

It is certified that error appears in the above-identified patent and that said Letters Patent is hereby corrected as shown below:

Claim 9, Column 4, line 34: "rotations" should read as --rotation--

Claim 17, Column 6, line 19: insert --the-- before "transmission"

Claim 18, Column 6, line 48: "potion" should read as --portion--

Signed and Sealed this

Seventeenth Day of June, 2008

JON W. DUDAS
*Director of the United States Patent and Trademark Office*